United States Patent [19]

St-Pierre

[11] Patent Number: 5,546,894
[45] Date of Patent: Aug. 20, 1996

[54] SELF-CLOSABLE FOOD CONTAINER ASSEMBLY FOR AN ANIMAL WITH A MUZZLE

[76] Inventor: Roger St-Pierre, RR 2, Site 18, Boîte, Pokemouche, Nouveau Brunswick, Canada, E0B 2J0

[21] Appl. No.: 428,985

[22] Filed: Apr. 26, 1995

[51] Int. Cl.⁶ ................................................. A01K 5/01
[52] U.S. Cl. ........................................................... 119/61
[58] Field of Search ............................ 119/61, 62, 63, 119/72, 74, 75

[56]                References Cited

U.S. PATENT DOCUMENTS

| | | | |
|---|---|---|---|
| 2,554,086 | 5/1951 | Block | 119/51.5 |
| 3,077,863 | 2/1963 | Chilovich | 119/62 |
| 5,209,184 | 5/1993 | Sharkan et al. | 119/61 |

FOREIGN PATENT DOCUMENTS 2010198   8/1991   Canada .

*Primary Examiner*—Gene Mancene
*Assistant Examiner*—Thomas Price
*Attorney, Agent, or Firm*—Lowe, Price, Leblanc & Becker

[57]                ABSTRACT

The self-closable food container assembly for an animal with a muzzle, has a food container provided with a top opening properly sized to give the animal access to food contained in the food container. The food container assembly further has a lid tiltably mounted about a pivot axis onto the food container. The lid is movable between a closed position where the lid covers the top opening of the food container, and an open position where the lid uncovers the top opening of the food container. The lid has a front edge that is generally parallel to the pivot axis and is embossed to define an upwardly projecting cavity into which the animal may insert its muzzle to lift the lid and thereby have access to the food contained in the food container. The food container assembly further has a mechanism for returning the lid to its closed position as soon as the animal removes its muzzle from under the lid.

13 Claims, 3 Drawing Sheets

SELF-CLOSABLE FOOD CONTAINER ASSEMBLY FOR AN ANIMAL WITH A MUZZLE

BACKGROUND OF THE INVENTION

1. Field of the Invention

The invention generally relates to a food container for feeding an animal, and more particularly to a self-closable food container assembly for an animal with a muzzle.

2. Description of Related Art

Known in the art is Canadian laid open patent application n° 2,010,198 (Ogonoski) filed on Feb. 16, 1990 and published on Aug. 16, 1991, which describes an animal food container provided with a hinged lid for protecting the food contained in the food container from injurious weather precipitations, flies, birds and rodents outdoors, and for contributing to odor reduction and neatness indoors. The lid is designed to sufficiently overlap the container on all sides so that the animal can put its muzzle under the lid and lift the lid to reach the food contained in the container. The lid is either provided with a spring or a stop mechanism causing the lid to close over the container after the animal moves away after feeding.

However, since the lid overlaps the container on all sides, the animal may have trouble finding the right edge of the lid to lift for reaching the food in the container. Furthermore, since the lid has a straight border edge, the animal may hurt its muzzle or eyes while trying to lift the lid. As it is not every animal which demonstrates a great deal of intelligence capacities, it would be desirable to facilitate as much as possible the access to the food contained in the container.

OBJECTS OF THE INVENTION

It is therefore an object of the present invention to provide a self-closable food container assembly for an animal with a muzzle, which incites and attracts the instinctive curiosity of the animal and facilitate the access to the food contained in the container.

It is a subsidiary object of the invention to provide such a food container assembly which is relatively simple in design and inexpensive to manufacture, but yet which is highly effective and is devoid of dangerous sharp edges where the animal passes its muzzle to reach the food in the container.

SUMMARY OF THE INVENTION

According to the present invention, there is provided a self-closable food container assembly for an animal with a muzzle, comprising:

a food container provided with a top opening properly sized to give the animal access to food contained in the food container;

a lid tiltably mounted about a pivot axis onto the food container, the lid being movable between a closed position where the lid covers the top opening of the food container and an open position where the lid uncovers the top opening of the food container, the lid having a front edge that is generally parallel to said pivot axis and is embossed to define an upwardly projecting cavity into which the animal may insert its muzzle to lift the lid and thereby have access to the food contained in the food container; and means for returning the lid to its closed position as soon as the animal removes its muzzle from under the lid.

Preferably, the food container has a front upper edge that is generally parallel to said pivot axis and is embossed to define a rearwardly projecting complementary cavity contiguous to the upwardly projecting cavity of the lid when the lid is in said closed position.

Preferably, said upwardly projecting cavity extends rearwardly from the front edge of the lid and has a forwardly substantially flaring shape, and said rearwardly projecting cavity extends downwardly from the front upper edge of the food container and has an upwardly substantially flaring shape.

Preferably, said upwardly projecting cavity and said rearwardly projecting cavity are both delineated by a smooth inner surface for slideably receiving the muzzle of the animal.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF THE PREFERRED EMBODIMENTS

Figure 1:
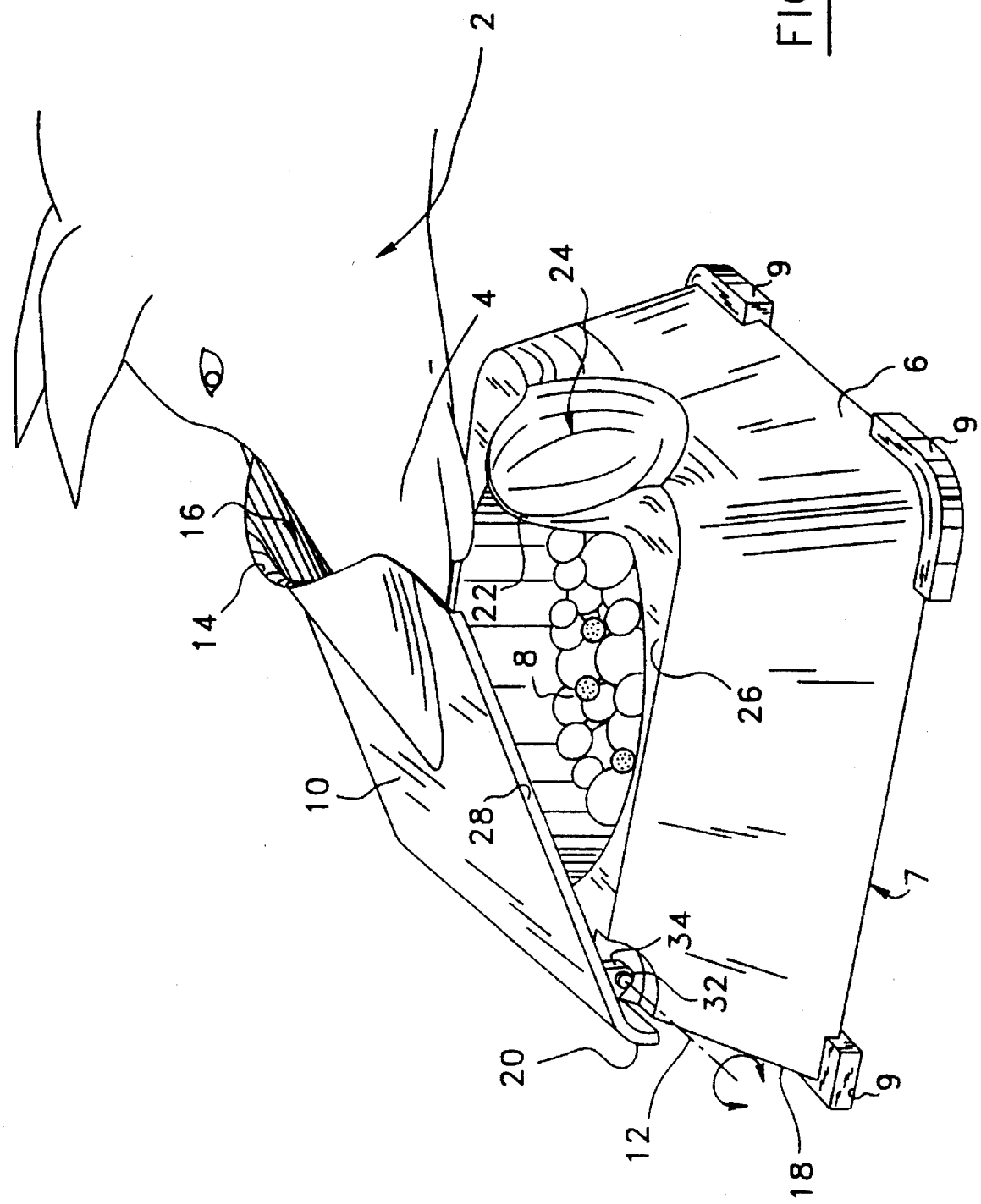
FIG. 1 shows a perspective view of a self-closable food container assembly for an animal with a muzzle, according to the present invention.

In the following description and in the drawings, like reference characters designate like or corresponding parts throughout the several views.

The embodiments of the food container assembly that are shown in the Figures are particularly suitable for feeding a dog. Hence, the following description will be made in relation with such a dog. However, it must be well understood that the invention can conveniently be applied and used for any other type of animal with a muzzle, as for example a horse. It will become apparent, from the following description, that the size and weight of the food container assembly can be adapted easily to the size of the animal for which it is intended.

Referring to FIG. 1, there is shown a self-closable food container assembly for an animal 2 with a muzzle 4, i.e. a dog, and the way the animal 2 feeds itself. The assembly comprises a food container 6 provided with a top opening properly sized to give the animal 2 access to food 8 contained in the food container 6. The assembly further comprises a lid 10 tiltably mounted about a pivot axis 12 onto the food container 6, for protecting the food 8 (solid or water) from outside injurious elements, e.g. rain, sun, insects, rodents, etc. that may spoil or contaminate the food 8 left in the container 6 by the animal 2 when it has finished feeding and is no more hungry.

Figure 2:
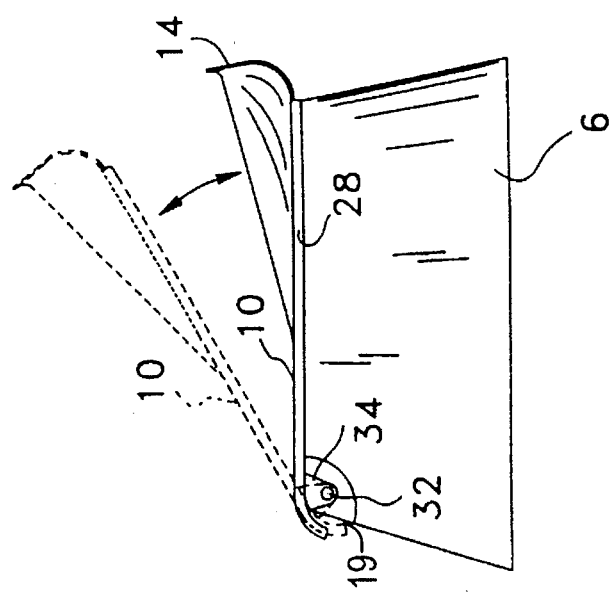
FIG. 2 shows a side elevation view of a food container assembly according to the present invention.

Referring to FIG. 2, the lid 10 is movable between a closed position (shown in solid lines) where the lid 10 covers the top opening of the food container 6, and an open position (shown in dashed lines) where the lid 10 uncovers the top opening of the food container 6.

Referring to FIG. 1, the lid 10 has a front edge 14 that is generally parallel to the pivot axis 12 and is embossed to define an upwardly projecting cavity 16 into which the animal 2 may insert its muzzle 4 to lift the lid 10 and thereby have access to the food 8 contained in the food container 6. The motives explaining the use of such a cavity 16 are to attract and incite the curiosity of the animal 2, so that it will instinctively insert its muzzle 4 in the cavity 16 and discover at once that it may reach the food 8 in the container 6 by simply inserting further its muzzle 4 in the cavity and thereby easily lifting the lid 10. Experiments carried out by the inventor on dogs and even cats have shown that it is effectively the case.

As shown in FIG. 1, the food container 6 may advantageously have a front upper edge 22 that is generally parallel to the pivot axis 12 and is embossed to define a rearwardly projecting complementary cavity 24 contiguous to the upwardly projecting cavity 16 of the lid 10 when the lid 10 is in its closed position, as shown in solid lines in FIG. 2.

The upwardly projecting cavity 16 extends rearwardly from the front edge 14 of the lid 10 and has a forwardly substantially flaring shape. The rearwardly projecting cavity 24 extends downwardly from the front upper edge 22 of the food container 6 and has an upwardly substantially flaring shape.

The assembly also comprises a mechanism for returning the lid 10 to its closed position as soon as the animal 2 removes its muzzle 4 from under the lid 10. The food container 6 comprises a rear wall 18 downwardly extending under the lid 10. The pivot axis 12 is located at an upper edge of the rear wall 18. The lid 10 has a downwardly curved rear edge 20 rearwardly projecting from the pivot axis 12, beyond the upper edge of the rear wall 18 so that the rear edge 20 abuts against the rear wall 18 (see the position of the lid 10 in dashed lines in FIG. 2) to prevent the lid 10 from opening beyond a position where the lid 10 falls in its closed position by gravity. The stop 19 formed by the rear wall 18 of the food container 6, against which the rear edge 20 of the lid 10 abuts when the lid 10 is in its open position, conveniently provides the mechanism for returning the lid 10 to its closed position. However, other types of mechanisms could be used as well, such as an arrangement of springs between the lid 10 and the food container 6, or spring hinges, urging the lid 10 into its closed position.

The food container 6 comprises a substantially flat top wall 26 including the top opening of the food container 6. The lid 10 is provided with a peripheral downwardly projecting border 28 extending all around the lid 10 except along the upwardly projecting cavity 16. The border 28 substantially overlaps the top wall 26 when the lid 10 is in its closed position, to ensure proper closing.

Preferably, the stop is configured to prevent tilting of the lid 10 beyond 80° from its closed (horizontal) position.

The upwardly projecting cavity 16 and the rearwardly projecting cavity 24 are both delineated by a smooth inner surface for slideably receiving the muzzle 4 of the animal 2, to protect the animal from any injuries during the lifting of the lid.

The food container 6 may have a flat underside wall 7 having four corners provided with non-slippery rubber pads 9.

Figure 3:
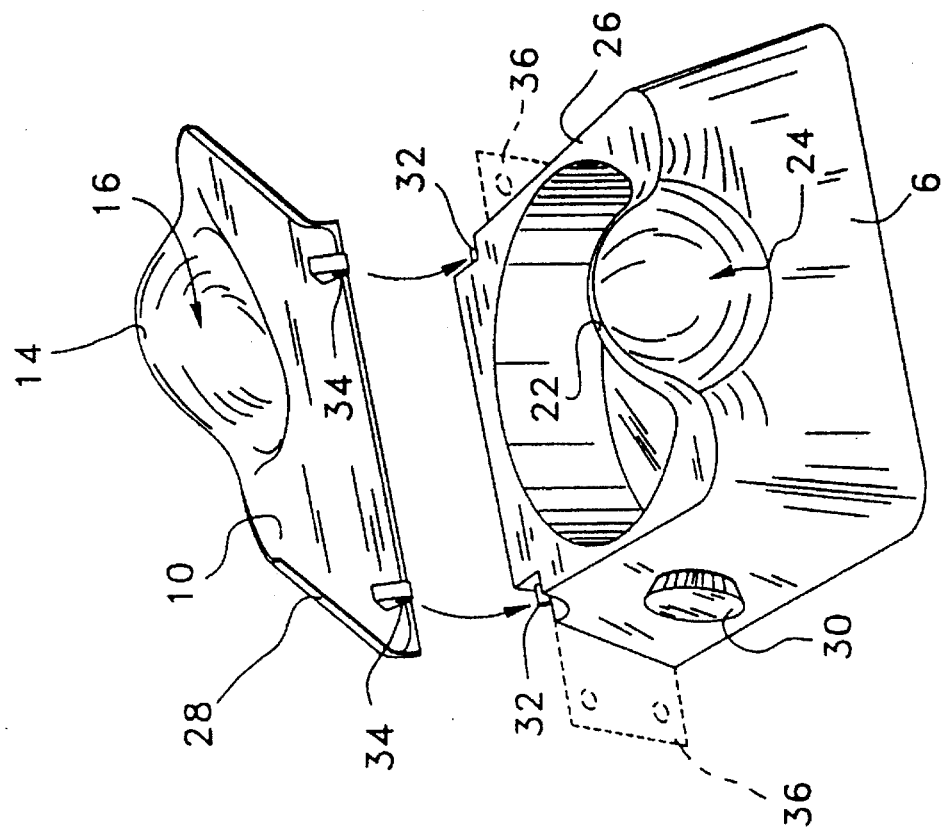
FIG. 3 shows an exploded view of a food container assembly according to the present invention.

Referring to FIG. 3, the food container 6 may comprise a fillable hollow body having an aperture provided with a removable closure 30. Thus, the body can be filled with water or sand to increase its weight and better stand in place.

The upper edge of the rear wall 18 of the food container 6 is provided with a pair of axially aligned, outwardly projecting pins 32 at opposite ends thereof. The lid 10 has a pair of spaced apart downwardly projecting ears 34 aligned with the pins 32. The ears 34 are provided with holes for rotatively receiving the pins 32 along the pivot axis 12 (shown in FIG. 1), to form convenient hinges for the lid 10. By using resilient plastic for the ears 34, the lid 10 can be removed from the food container 6 if desired.

The food container 6 may be provided with a pair of support brackets 36 (shown in dashed lines) along its rear wall 18, for securing the food container 6 to an accommodating wall at a desired height, to feed taller animals.

Figure 4:
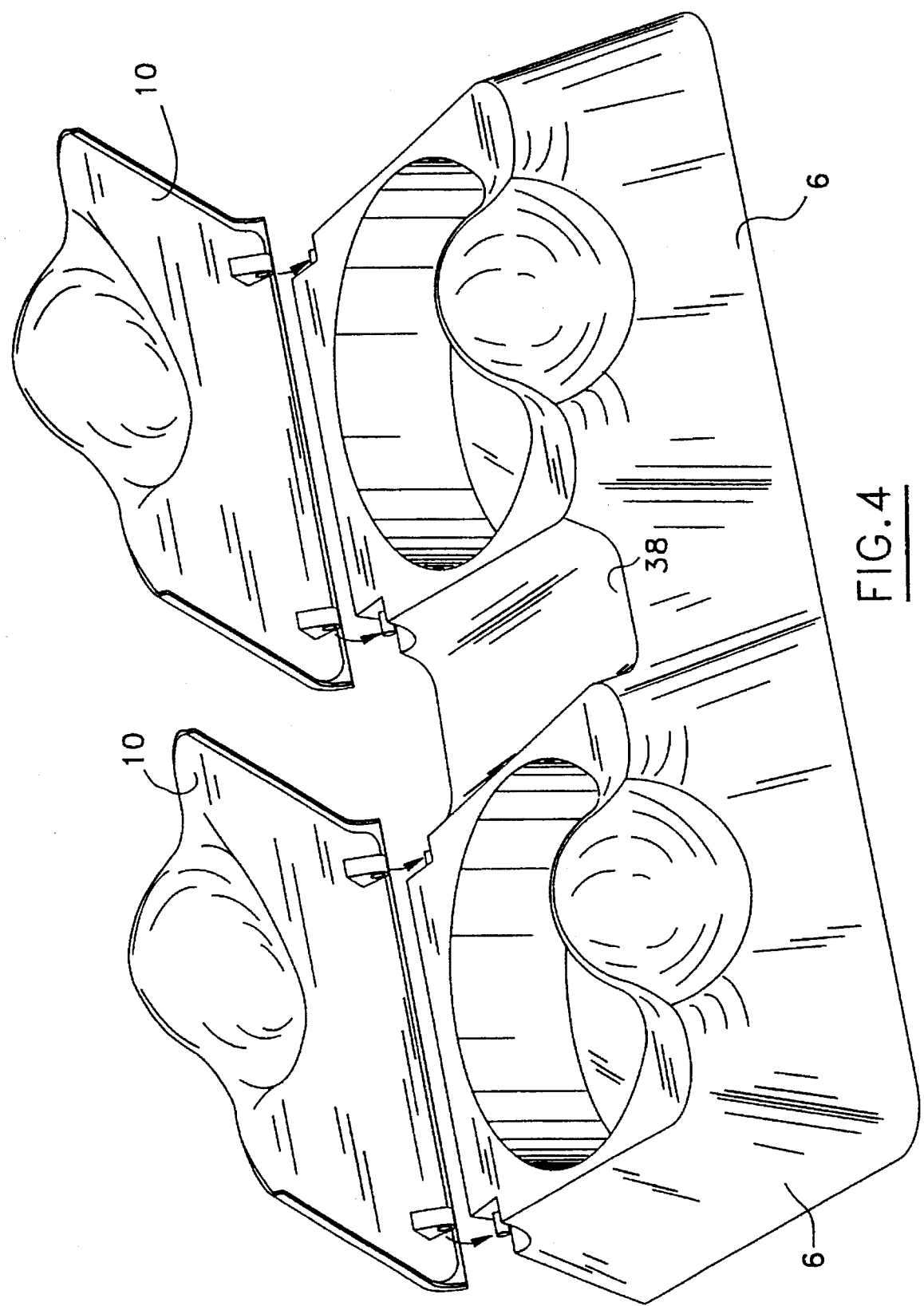
FIG. 4 shows an exploded view of a double food container assembly according to the present invention.

Referring to FIG. 4, there is shown a double food container assembly according to the present invention, that may conveniently be used to store separately solid food and water. In that case, the double food container assembly comprises a pair of food container assemblies each as hereinabove described, in addition to a spacing member 38 for connecting the food containers 6 together at a predetermined distance from one another. The spacing member 38 has a top side extending between the food containers 6 at a lower level than a level of the top openings of the food containers 6.

The spacing member 38 and the food containers 6 may form an integral piece.

The food container assembly can conveniently be made of plastic or stainless steel, or any other suitable material.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. A self-closable food container assembly for an animal with a muzzle, comprising:

a food container provided with a top opening properly sized to give the animal access to food contained in the food container;

a lid tiltably mounted about a pivot axis onto the food container, the lid being movable between a closed position where the lid covers the top opening of the food container and an open position where the lid uncovers the top opening of the food container, the lid having a front edge that is generally parallel to said pivot axis and is embossed to define an upwardly projecting cavity into which the animal may insert its muzzle to lift the lid and thereby have access to the food contained in the food container; and means for returning the lid to its closed position as soon as the animal removes its muzzle from under the lid;

wherein the food container has a front upper edge that is generally parallel to said pivot axis and is embossed to define a rearwardly projecting complementary cavity contiguous to the upwardly projecting cavity of the lid when the lid is in said closed position.

2. A food container assembly according to claim 1, wherein:

said upwardly projecting cavity extends rearwardly from the front edge of the lid and has a forwardly substantially flaring shape; and said rearwardly projecting cavity extends downwardly from the front upper edge of the food container and has an upwardly substantially flaring shape.

3. A food container assembly according to claim 2, wherein:

the food container comprises a fillable hollow body having an aperture provided with a removable closure, a substantially flat top wall including the top opening, and a rear wall downwardly extending under the lid, said pivot axis being located at an upper edge of the rear wall, the upper edge of the rear wall of the food container being provided with a pair of axially aligned, outwardly projecting pins at opposite ends thereof, the rear wall of the food container being provided with a pair of support brackets for securing the food container to an accommodating wall;

the lid has a downwardly curved rear edge rearwardly projecting from said pivot axis, beyond the upper edge of the rear wall of the food container so that the rear edge of the lid abuts against the rear wall of the food container to prevent the lid from opening beyond a position where the lid falls in said closed position by gravity, the lid being provided with a peripheral downwardly projecting border extending all around the lid except along the upwardly projecting cavity, said border substantially overlapping the top wall of the food container when the lid is in said closed position, the lid having a pair of spaced apart downwardly projecting ears aligned with the pins on the food container, said ears being provided with holes rotatively receiving the pins along said pivot axis;

said means for returning comprises a stop formed by the rear wall of the food container, against which the rear edge of the lid abuts when the lid is in said open position, said stop being configured to prevent tilting of the lid beyond 80° from said closed position; and said upwardly projecting cavity and said rearwardly projecting cavity are both delineated by a smooth inner surface for slideably receiving the muzzle of the animal.

4. A food container assembly according to claim 1, wherein:

the food container comprises a rear wall downwardly extending under the lid, said pivot axis being located at an upper edge of the rear wall;

the lid has a downwardly curved rear edge rearwardly projecting from said pivot axis, beyond the upper edge of the rear wall of the food container so that the rear edge of the lid abuts against the rear wall of the food container to prevent the lid from opening beyond a position where the lid falls in said closed position by gravity; and said means for returning comprises a stop formed by the rear wall of the food container, against which the rear edge of the lid abuts when the lid is in said open position.

5. A food container assembly according to claim 4, wherein:

the food container comprises a substantially flat top wall including the top opening of the food container; and the lid is provided with a peripheral downwardly projecting border extending all around the lid except along the upwardly projecting cavity, the border substantially overlapping the top wall of the food container when the lid is in said closed position.

6. A food container assembly according to claim 4, wherein said stop is configured to prevent tilting of the lid beyond 80° from said closed position.

7. A food container assembly according to claim 4, wherein:

the upper edge of the rear wall of the food container is provided with a pair of axially aligned, outwardly projecting pins at opposite ends thereof; and the lid has a pair of spaced apart downwardly projecting ears aligned with the pins on the food container, said ears being provided with holes rotatively receiving the pins along said pivot axis.

8. A food container assembly according to claim 1, wherein said upwardly projecting cavity and said rearwardly projecting cavity are both delineated by a smooth inner surface for slideably receiving the muzzle of the animal.

9. A food container assembly according to claim 1, wherein the food container comprises a fillable hollow body having an aperture provided with a removable closure.

10. A food container assembly according to claim 1, wherein the food container has a rear wall provided with a pair of support brackets for securing the food container to an accommodating wall.

11. A food container assembly according to claim 1, further comprising:

an additional food container provided with a top opening properly sized to give the animal access to food contained in the additional food container;

an additional lid tiltably mounted about a pivot axis onto the additional food container, the additional lid being movable between a closed position where the additional lid covers the top opening of the additional food container and an open position where the additional lid uncovers the top opening of the additional food container, the additional lid having a front edge that is generally parallel to said pivot axis of the additional lid and is embossed to define an upwardly projecting cavity into which the animal may insert its muzzle to lift the additional lid and thereby have access to the food contained in the additional food container;

means for returning the additional lid to its closed position as soon as the animal removes its muzzle from under the additional lid; and a spacing member connecting the food containers together at a predetermined distance from one another, the spacing member having a top side extending between the food containers at a lower level than a level of the top openings of the food containers.

12. A food container assembly according to claim 11, wherein the spacing member and the food containers form an integral piece.

13. A food container assembly according to claim 1, wherein said food container has a substantially flat underside wall having four corners provided with non-slippery rubber pads.

* * * * *